US009336036B2

(12) United States Patent
Dong et al.

(10) Patent No.: US 9,336,036 B2
(45) Date of Patent: May 10, 2016

(54) SYSTEM METHOD FOR MEMORY VIRTUALIZATION CONTROL LOGIC FOR TRANSLATING VIRTUAL MEMORY IN SPACE OF GUEST MEMORY BASED ON TRANSLATED CODES IN RESPONSE TO MEMORY FAILURE

(75) Inventors: Yaozu Dong, Shanghai (CN); Yun Wang, Shanghai (CN); Yunhong Jiang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 179 days.

(21) Appl. No.: 13/976,671

(22) PCT Filed: Mar. 31, 2011

(86) PCT No.: PCT/CN2011/000555
§ 371 (c)(1),
(2), (4) Date: Sep. 4, 2014

(87) PCT Pub. No.: WO2012/129729
PCT Pub. Date: Oct. 4, 2012

(65) Prior Publication Data
US 2014/0379955 A1 Dec. 25, 2014

(51) Int. Cl.
G06F 9/00 (2006.01)
G06F 9/455 (2006.01)
(Continued)

(52) U.S. Cl.
CPC ........ *G06F 9/45558* (2013.01); *G06F 11/1484* (2013.01); *G06F 11/1666* (2013.01);
(Continued)

(58) Field of Classification Search
CPC .................................................. G06F 9/45558
USPC ........ 714/2, 15; 718/1, 100; 710/8–10, 52, 64
See application file for complete search history.

(56) References Cited

U.S. PATENT DOCUMENTS 7,533,229 B1 * 5/2009 van Rietschote ............. 711/161
8,234,655 B2 * 7/2012 Corry et al. ................... 719/312
(Continued)

FOREIGN PATENT DOCUMENTS

CN 101398768 4/2009
CN 101632128 1/2010
(Continued)

OTHER PUBLICATIONS

European Search Report for European Patent Application No. 11862809.8 mailed Jul. 29, 2014, 7 pages.
(Continued)

*Primary Examiner* — Tammara Peyton
(74) *Attorney, Agent, or Firm* — Blakely, Sokoloff, Taylor & Zafman LLP

(57) ABSTRACT

A virtualization based system comprises a host and a plurality of virtual machines that may each comprises a guest memory. A virtual machine monitor has access to underlying platform hardware in the system and may control physical resources in the platform. The platform hardware comprises a processor and a memory coupled to the processor. Further, the VMM may manage guest software including guest operating systems running on the virtual machines. A binary translation logic may replace guest memory writing instructions corresponding to a hot spot in guest application with translated codes to generate a mirrored content for the guest memory. The binary translation logic may combine one or more of the guest memory writing instructions in a region and keep the region atomic. The processor may execute the translated codes in an atomic region together to write a content in the guest memory and a mirrored content in a mirroring memory. The VMM may allocate a memory region in the host memory for the mirroring memory. The guest memory comprises one or more guest memory pages and the mirroring memory may comprise one or more mirroring memory pages. The VMM may add an offset to a virtual address of a guest memory page to obtain a virtual address of a mirroring memory page. The VMM may manage or emulate a guest page table comprising a mapping between virtual address to guest physical addresses for the guest memory. The VMM may synchronize a shadow page table with the mapping in the guest page table. The shadow page table comprises a mapping of virtual addresses to host physical addresses for the guest memory and a mapping of virtual addresses to host physical addresses for the mirroring page. Upon a memory failure in the guest memory page, the VMM may restore the content of the corrupted guest memory page from the mirroring memory page.

17 Claims, 7 Drawing Sheets

(51) Int. Cl.
*G06F 11/14* (2006.01)
*G06F 11/16* (2006.01)
*G06F 12/10* (2016.01)
*G06F 11/20* (2006.01)

(52) U.S. Cl.
CPC ........ *G06F12/1009* (2013.01); *G06F 12/1027* (2013.01); *G06F 11/20* (2013.01); *G06F 2009/45562* (2013.01)

(56) References Cited

U.S. PATENT DOCUMENTS

| | | | | |
|---|---|---|---|---|
| 8,261,267 | B2 * | 9/2012 | Iwamatsu | G06F 12/109 |
| | | | | 711/E12.061 |
| 9,032,397 | B2 * | 5/2015 | Miller | G06F 9/4856 |
| | | | | 703/23 |
| 9,128,769 | B2 * | 9/2015 | Schroeder | G06F 9/5077 |
| 2006/0259732 | A1 | 11/2006 | Traut et al. | |
| 2009/0013149 | A1 | 1/2009 | Uhlig et al. | |
| 2011/0072430 | A1 | 3/2011 | Mani | |

FOREIGN PATENT DOCUMENTS

| CN | 101866307 | 10/2010 |
|---|---|---|
| WO | WO-2012129729 | 10/2012 |

OTHER PUBLICATIONS

Office Action for European Patent Application No. 11862809.8 mailed Jul. 9, 2015, 5 pages.
First Office Action for Chinese Patent Application No. 201180069728.4 mailed Sep. 25, 2015, 9 pages, no English translation.
Cully, Brendan, et al., "Remus: High Availability via Asynchronous Virtual Machine Replication", NSDI '08: 5th USENIX Symposium on Networked Systems Design and Implementation, 14 pages.
Dong, Yaozu, et al., "Extending Xen* with Intel® Virtualization Technology", Intel Technology Journal, vol. 10, Issue 03, published Aug. 10, 2006, ISSN 1535-864X, DOI: 10.1535/itj.1003, 14 pages.
Dong, Yaozu, "Translated as—Analysis on Xen Virtual Machine Architecture", Open Source World Monthly, Oct. 2006, no English translation, 7 pages.
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), Exhibit 1008, 15 pages., (Dec. 9, 2002).
Intel Corporation, "Intel 64 and IA-32 Intel Architecture Software Developer's Manual, vol. 3A: System Programming Guide, Part 1", Order No. 253668-0550US, Jun. 2015, 640 pages.

* cited by examiner

SYSTEM METHOD FOR MEMORY VIRTUALIZATION CONTROL LOGIC FOR TRANSLATING VIRTUAL MEMORY IN SPACE OF GUEST MEMORY BASED ON TRANSLATED CODES IN RESPONSE TO MEMORY FAILURE

CLAIM OF PRIORITY

This application is a U.S. National Phase application under 35 U.S.C. §371 of International Application No. PCT/CN2011/000555, filed Mar. 31, 2011, entitled "MEMORY MIRRORING AND REDUNDANCY GENERATION FOR HIGH AVAILABILITY," the entire contents of which are incorporated herein by reference.

BACKGROUND

Virtualization enables a single host machine with hardware and software support for virtualization to present an abstraction of machine interface, such that the underlying hardware of the host machine appears as one or more independently operating virtual machines. Each virtual machine may therefore function as a self-contained platform. Virtualization technology may be used to allow multiple guest operating systems and/or other guest software to coexist and execute apparently simultaneously and apparently independently on multiple virtual machines while actually physically executing on the same hardware platform. A virtual machine may mimic the hardware of the host machine or alternatively present a different hardware abstraction altogether.

Virtualization systems may include a virtual machine monitor (VMM) which may control the host machine. The VMM provides guest software operating in a virtual machine with a set of resources (e.g., processors, memory, IO devices). The VMM may use facilities of hardware virtualization assistance to provide services to a virtual machine and to provide protection from and between multiple virtual machines executing on the host machine. The VMM may create virtual devices, emulated in software in the VMM, which are included in the virtual machine (e.g., virtual IO devices). The VMM handles/emulates instructions in software in a manner suitable for sharing the host machine hardware for the virtual machines on which the guest software is executing. Examples of VMM may comprise a hybrid VMM, a host based VMM and a hypervisor VMM. In the hypervisor architecture, the VMM may have access to the platform hardware and control physical resources in the underlying platform.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description may relate to techniques for memory failure recovery. The implementation of the techniques is not restricted in computing systems; it may be used by any execution environments for similar purposes, such as, for example, any other digital/electronic device. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures and full software instruction sequences have not been shown in detail in order not to obscure the invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

The following description may include terms, such as first, second, etc. that are used for descriptive purposes only and are not to be construed as limiting.

Figure 1:
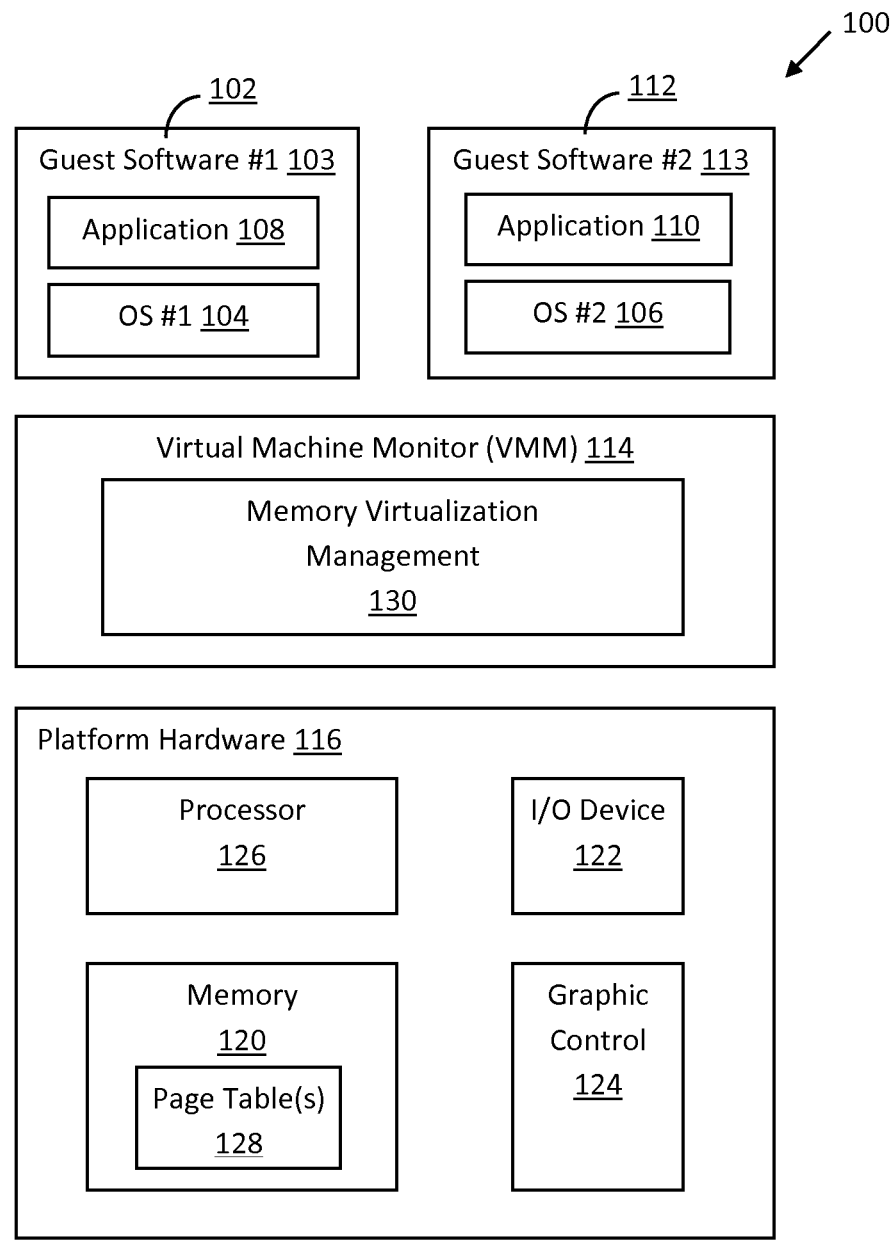
FIG. 1 is a schematic diagram of a high level structure of an exemplary virtual machine environment according to an embodiment of the invention.

FIG. 1 illustrates one embodiment of a virtual-machine environment 100. In this embodiment, a processor-based platform 116 may execute a VMM 114 or any other virtual machine control logic. The VMM, though implemented in software, may emulate and export a virtual machine interface to higher level software. Such higher level software may comprise a standard OS, a real time OS, or may be a stripped-down environment with limited operating system functionality and may not include OS facilities available in a standard OS in some embodiments. Alternatively, for example, the VMM 114 may be run within, or using the services of, another VMM. VMMs may be implemented, for example, in hardware, software, firmware or by a combination of various techniques in some embodiments. The components of the VMM executing directly on the platform hardware are referred to herein as host components of the VMM. In another embodiment, examples of VMM 114 may be a hybrid virtual machine monitor, a host virtual machine monitor or a hypervisor virtual machine monitor.

The platform hardware 116 may be a personal computer (PC), server, mainframe, handheld device such as a personal digital assistant (PDA) or "smart" mobile phone, Internet Protocol device, digital camera, portable computer, handheld PC such as netbook or notebook or Tablet, or embedded applications such as a micro controller, a digital signal processor (DSP), system on a chip (SoC), network computers (NetPC), set-top boxes, network hubs, wide area network (WAN) switches, or another processor-based system.

The platform hardware 116 includes at least a processor 126 and memory 120. Processor 126 may be any type of processor capable of executing programs, such as a microprocessor, digital signal processor, microcontroller, or the like. The processor may include microcode, programmable logic or hard coded logic for execution in embodiments. Although FIG. 1 shows only one such processor 126, there may be one or more processors in the system in an embodiment. Additionally, processor 126 may include multiple cores, support for multiple threads, or the like. The processor 126 may include microcode, programmable logic or hard-coded logic for performing operations associated with various embodiments described herein.

Memory 120 may comprise random access memory (RAM), read only memory (ROM), flash memory, any other type of volatile memory devices or non-volatile memory devices, or combination of the above devices, or any other type of machine medium readable by processor 126 in various embodiments. Memory 120 may store instructions and/or data for performing program execution and other method embodiments. In some embodiments, some elements of the invention may be implemented in other system components, e.g., in the platform chipset or in the system's one or more memory controllers.

The VMM 114 may present to guest software an abstraction of one or more virtual machines. The VMM 114 may present the same or different abstractions of VMs to the various guest software. FIG. 1 shows two virtual machines, 102 and 112. Guest software such as guest software 103 and 113 running on each virtual machine may include a guest OS such as a guest OS 104 or 106 and various guest software applications 108 and 110. Guest software 103 and 113 may access resources (e.g., processor registers, memory and I/O devices) within the virtual machines on which the guest software 103 and 113 is running and to perform other functions. For example, the guest software 103 and 113 may have access to all registers, caches, structures, I/O devices, memory and the like, according to the architecture of the processor and platform presented in the virtual machine 102 and 112.

In one embodiment, in response to a virtual processor 102 referencing a memory location in its virtual address space, a reference to an actual address in the physical memory of the host machine 116 (or machine physical memory) may be generated by memory virtualization management logic 130, which may be implemented in hardware (sometimes incorporated into the processor 126, e.g., memory management unit (MMU)) and/or software and/or firmware. For example, memory virtualization management logic 130 may translate from virtual address to physical address for a memory page. Memory virtualization management logic 130, among other functions, may map a location in the virtual memory space of the guest machine to a location in physical memory address space of the host machine. In the example of FIG. 1, the memory virtualization management logic 130 may among other functions map from virtual memory space to physical memory space. The physical memory may be divided into parts such as pages that may be interleaved with pages from other processes in physical memory. While the example of FIG. 1 comprises memory virtualization management logic 130, in some embodiments, one or more control logics may be utilized to realize the memory virtualization management logic 130.

The memory virtualization management logic 130 may perform address translation, for example, the translation of a virtual address to a physical address, based on any memory management technique, such as paging. The memory virtualization management logic 130 may refer to one or more data structures stored in processor 126, memory 120, any other memory devices or any other storage locations in the platform hardware 116 and/or any combination of these components and locations. For example, the data structures may comprise page directories and page tables. The memory virtualization management logic 130 may utilize a page table that comprises a mapping from a first address to a second address, e.g., for a memory page. For example, the memory virtualization management logic 130 may translate from virtual memory address of a guest machine to linear memory address (such as in Intel x86 architecture), which may further be translated to physical memory address of host machine, e.g., based on a physical page table. In another embodiment, memory virtualization management logic 130 may directly translate from virtual memory address into physical memory address of host machine based on a physical page table, such as for Intel Itanium® architecture that may not have segmentation mechanism or x86 architecture with segmentation disabled. As used herein, the term "virtual memory address" may include any address referred to as first address that may be used as input address to be translated to a second address host physical memory address. For example, "virtual memory address" may include any address referred to as a logical or a linear address depending on, e.g., processor architecture.

Figure 2:
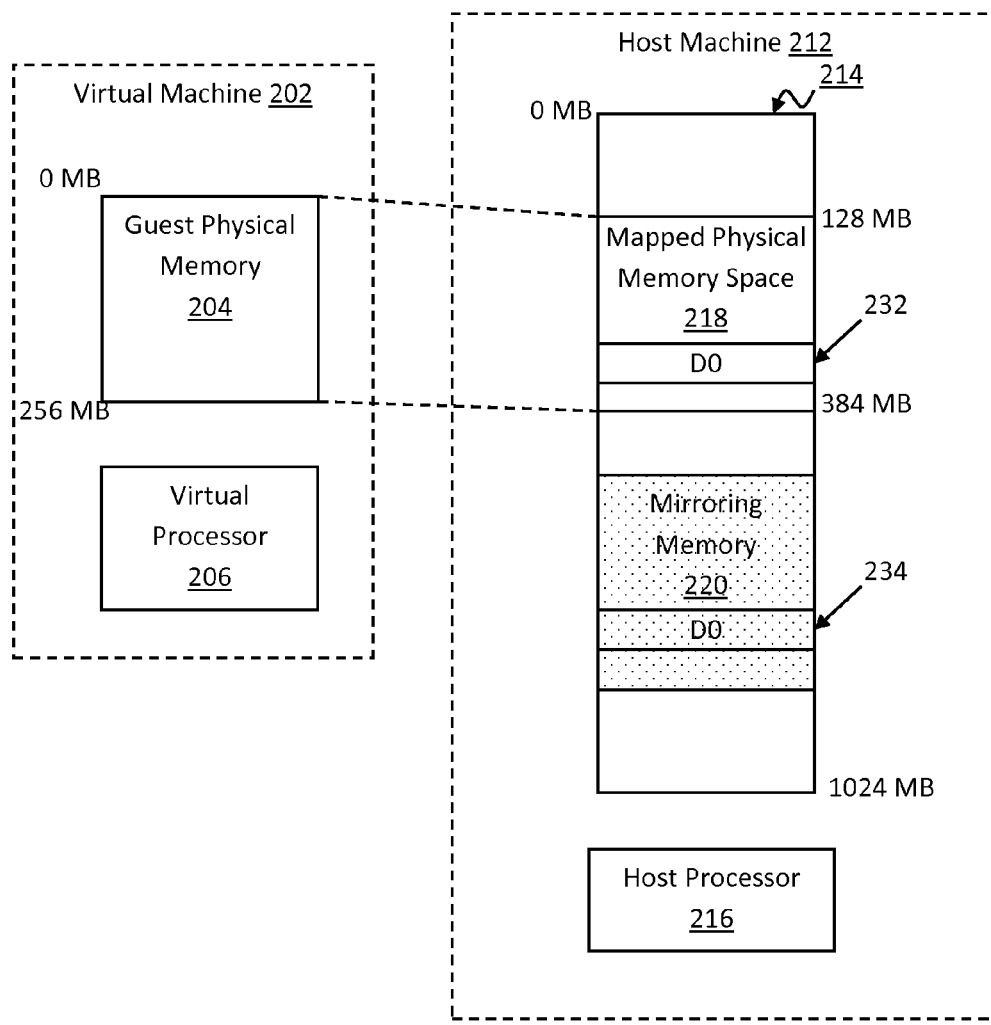
FIG. 2 is a schematic diagram of a relationship between a virtual machine and a host machine in one embodiment.

FIG. 2 depicts a relationship between one or more virtual machines executing on a host machine with regard to the mapping of guest memory in one embodiment. FIG. 2 illustrates how guest-physical memory is remapped through the virtualization system of the host machine. A virtual machine such as virtual machine 202 may present a virtual processor 206 to guest software running on the virtual machine 202. The virtual machine 202 may provide an abstraction of physical memory to the guest operating system or other guest software, guest-physical memory 204. As guest software executes on the virtual machine 202, it is actually executed by the host machine 212 on host processor 216 utilizing host-physical memory 214.

As shown in FIG. 2, in one embodiment, guest-physical memory 204 (which may be presented as a physical memory space starting at address 0 in virtual machine 202) is mapped to some contiguous region 218 in host-physical memory 214. If the virtual machine 202 is assigned 256 MB of memory, one possible mapping might be that virtual machine 202 is assigned a range of 128-384 MB. Although FIG. 2 illustrates an example of a virtual machine, some embodiments may have one or more virtual machines. For example, a guest-physical memory in each virtual machine may be mapped to a different portion of host-physical memory 214 and each virtual machine may reference a guest-physical address space of 0-256 MB. As shown in FIG. 2, the host machine 212 may have 1024 MB of host-physical memory. The VMM may be aware that each virtual machine's address space that maps to different portions of the host-physical address space.

In a more general embodiment, memory may be segmented or divided into several parts such as pages. Each page may contain a known amount of memory, e.g., based on processor architecture requirement, varying across implementations, e.g. a page may contain 4096 bytes of memory, 1 MB of memory, or any other amount of memory as may be desired for an application. For example, memory virtualization management such as 130 of FIG. 1 may support to segment the guest-physical memory 204 or the host-physical memory 214 into several pages of 4,096 ("4K") bytes each. The memory virtualization management logic 130 may map a page in a virtual memory to a page in host physical memory. Memory virtualization management logic 130 may use a page table or other data structure to specify the physical page location corresponding to a guest space physical page location.

The virtual machines and memory mapping shown in FIG. 2 are only one representation of one embodiment, in other embodiments, the actual number of virtual machines executing on a host machine may vary from one to many; the actual memory sizes of the host machine and the virtual machines may vary and be variable from virtual machine to virtual machine. The example depicts a contiguous allocation of memory to virtual machines; however, in some embodiment, the view of guest physical memory may not necessarily limit to be contiguous. In another embodiment, the guest physical address may not always start from address 0 MB. Embodiments of the invention may be used with systems containing more or less memory, and configured to operate on larger or smaller pages. The physical-memory pages allocated to a virtual machine may not be contiguous and might be distributed in the host-physical memory 214 interleaved with each other and with pages belonging to the VMM and to other host processes.

In one embodiment, runtime memory failure on the platform hardware may influence, e.g., reliability, serviceability and availability (RAS) of the platform. Hardware enhancement to memory architecture may provide certain level of enhanced RAS by correcting n-bit error with memory redundancy of n+1 bits per unit such as per cache line redundancy. However, memory failure may happen to a block of memory or several clustered blocks or with equal or more than n+1 bit error in one unit, which may not be recovered by hardware itself. Further, in a virtualized environment, although the memory failure, e.g., hareware un-recoverable, may be directed to guest OS for further processing, e.g., to contain the failure inside limited processes, the service running in guest may have to be aborted.

Software based virtual machine (VM) level fault tolerance such as VM log-and-replay or VM checkpoint may enhance RAS by generating a backup VM in case of hardware failure. VM log-and-replay and VM checkpoint may require duplication of the platform resources, e.g., processor, memory, I/O, for VM backup, and VMM intervention to the execution of VM.

Referring to FIG. 2, in an embodiment, a hypervisor such as VMM 114 of FIG. 1 may allocate a contiguous region in the host physical memory 214 for a mirroring memory 220 that mirrors physical memory 218 that is mapped to the guest-physical memory 204. The mirroring memory 220 may comprise one or more memory pages that are the same as or have the same content as the corresponding pages in the mapped physical memory 218. For example, the mirroring memory 220 may have a one to one redundancy configuration for the guest-physical memory 204. In another embodiment, the system may implement n to 1 redundancy configuration (for increased availability), e.g., by generating n bytes mirroring memory or n byte redundancy for one byte guest memory, wherein n is positive integer that is bigger than or equal to 1. In another embodiment, the system may implement n pages mirroring memory for one page guest memory, or in any unit of block to generate n blocks mirroring memory per one block guest memory. In some embodiments, the VMM 114 may send to the guest OS executing on the virtual machine 202 a request to cooperatively allocate redundant memory to mirror the guest-physical memory 204, e.g., by paravirtualization. The guest OS may allocate the redundant memory, e.g., by using memory balloon driver. The example depicts an embodiment of contiguous allocation of the mirroring memory. Embodiments of the invention may be used with systems containing more or less memory, and configured to operate on larger or smaller pages. The physical-memory pages allocated to a mirroring memory may not be contiguous and might be distributed in the host-physical memory 214 interleaved with each other and interleaved with pages belonging to the VMM and to other host processes.

Figure 3:
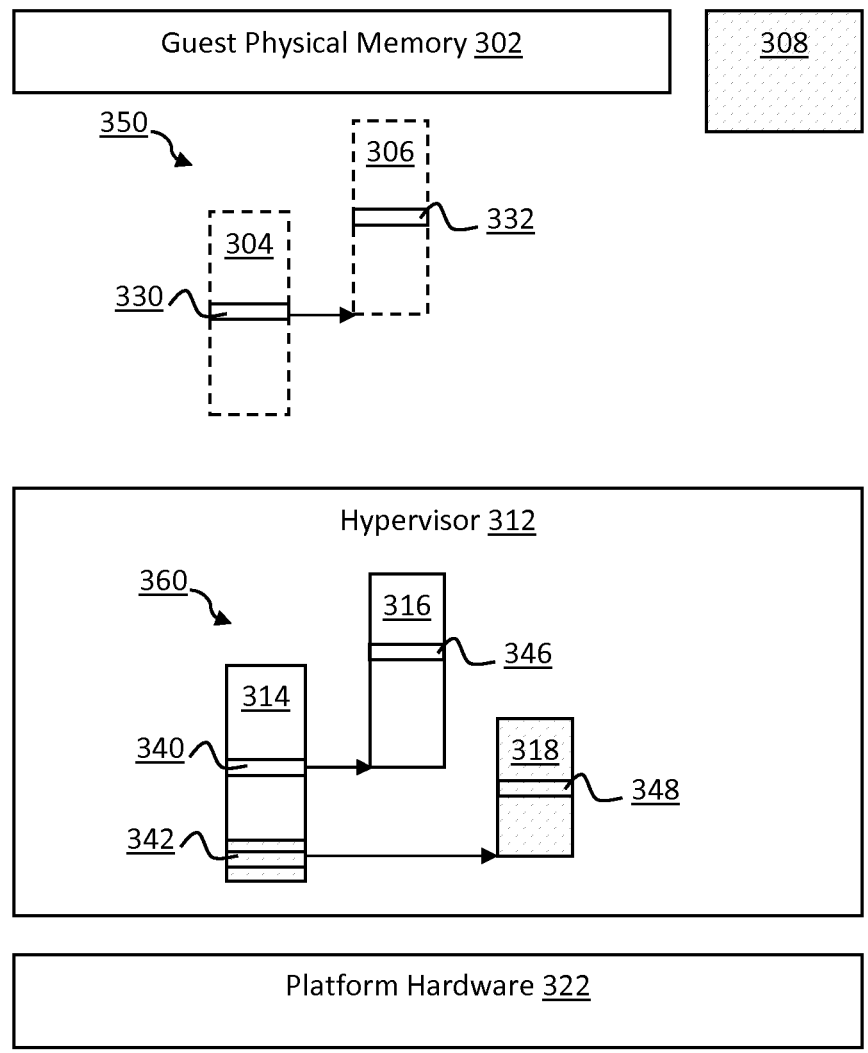
FIG. 3 is a schematic diagram of page table mechanism according to an embodiment of the invention.

FIG. 3 shows one example of page table mechanism used to translate or compute a physical address from virtual address. Examples of page table format may comprise instruction set architectures, e.g., the Intel Itanium Architecture, 32-bit, 64-bit and other variations such as Physical Address Extension (PAE)/Page Size Extensions (PSE) of the x86 architecture, among many others, and to other configurations. In some embodiments, the page table mechanism may comprise one page table for the whole system, a separate page table for each application, a separate page table for each segment, or some combination of these. The page table may be implemented as a tree-like page tables, a clustered hash page table, or even linear array etc. The page table may comprise one or more levels in some embodiments.

Guest software executing on each virtual machine may reference to a guest virtual address may be translated to a guest physical memory address based on a guest page table, e.g., in the guest. In another embodiment, the processor in the host machine may translate the guest virtual address to host physical memory address, by using a page table managed by VMM. In one example, for the translation, the VMM may use a host physical page table, e.g., a shadow page table. The shadow page table may synchronize with the guest page table for semantics in VMM. In another embodiment, the VMM may use a single host-physical page table such as a direct page table in, e.g., Xen paravirtualization, by cooperatively working with guest OS to hold the real translation information (e.g., from virtual address to host physical address). In this embodiment, a virtual machine may not have a guest page table in the guest physical memory, e.g., 302. The VMM may emulate a guest page table for the guest OS based on the host-physical or direct page table. In this embodiment, the guest OS may get knowledge of the emulated guest page table with additional data structure such as machine-to-guest-physical and guest-physical-to-machine page mapping.

Referring to FIG. 3, the guest-physical memory 302 may store a guest page table structure 350. The guest page table structure 350 may comprise a mapping between guest physical address and guest physical address. In the example of FIG.3, the guest page table structure 350 may comprise a guest directory table 304 and a guest page table 306. In some embodiments, any other format of data structures may be utilized by the guest software, e.g., memory management mechanism active in the guest (e.g., configured by the guest OS), to translate the guest virtual addresses to the guest physical addresses. For example, in one embodiment, the directory table 304 may store a directory entry 330 that may point to a base of the page table 306. Information from the guest page directory table 330 may comprise a base address of the page table 306. The page table 306 may comprise a page table entry 332. Information from the page table entry 332 may comprise a base address of a guest physical page (not shown) being accessed by the guest software. In one embodiment, in response to the guest software executing a process to reference to a guest virtual address, e.g., represented by X0, the guest software may use the guest page table structure 350 to translate the guest physical address X0 to a guest physical address (e.g., GPX0) within the corresponding guest physical page (e.g., represented by GPN0) being accessed. For example, the base address of the guest physical page, derived from page table entry 332, may be combined with appropriate bits of the guest physical address X0 to form the guest physical address GPX0.

Referring to FIG. 3, the hypervisor 312 may maintain a shadow page table structure 360 that is a shadow version of the guest page table structure 350. The shadow page table structure 360 may store a mapping between guest virtual addresses and host physical addresses. In the embodiment of FIG. 3, the shadow page table structure 360 comprises a shadow page directory table 314 that may point to a first shadow page table 316, which may synchronize with guest page table 306, and a second shadow page table 318, which may include a mapping for the mirroring memory 308. The shadow page directory table 314 may comprise a first directory table entry 340 that comprises a base address of the first shadow page table 316. The first shadow page table 316 comprises a first shadow page table entry 346 to point to a base (e.g., a base address) of a host physical page (e.g., represented by HPN0) being accessed in response to the guest machine referencing the corresponding guest virtual address X0. The hypervisor 312 may utilize the directory table 314 and first page table 316 to translate the guest virtual address X0 to the host physical address (e.g., HPX0) of the host physical page HPN0. For example, the hypervisor 312 may use the base address of the host physical page HPN0 and appropriate bits of the guest virtual address X0 for the translation.

FIG. 3 illustrates an embodiment of one or more mirroring pages 308 (e.g., represented by MHPN0, 1 . . . n) that mirrors the original mapped host physical page HPN0 for guest page GPN0 in a one to one mirroring configuration or a multiple to one mirroring configuration. The hypervisor may maintain a relationship to map from GPN0 to HPN0 and MHPN0. The one or more mirroring pages 308 may be allocated in the host physical memory by the hypervisor 312 or in cooperation with the guest software (e.g., guest OS) executing on the guest machine. The hypervisor 312 may store a mapping between a guest virtual address and the host physical address of the mirroring page(s) 308 in the shadow page table structure 360.

In one embodiment, the mirroring page(s) 308 may have the guest virtual address X1 that is an offset to the guest virtual address X0, e.g., X1=X0+mirror_offset, herein mirror_offset is an offset value that is used to form the guest virtual address X1 of a mirroring page 308. In one embodiment, the mirror_offset may have a fixed value; however, in some embodiments, the hypervisor 312 and/or a binary translation agency (that will be mentioned with regard to FIGS. 4 and 5) may utilize a predetermined policy to generate the mirror_offset that may be variable. In some embodiments, other policy may be used to position a mirroring page. In the embodiment of n to 1 minoring, the above may be performed a plurality of times to generate one or more translations for each $k^{th}$ minoring (k=1 . . . n).

The shadow page table structure 360 may further comprise a mapping between guest virtual addresses and host physical addresses for mirroring pages in a minoring memory space. For example, the shadow page directory table 314 may comprise a shadow directory table entry 342. The content of the shadow page table entry 342 comprises a base address of the second shadow page table 318 that is used for the mirroring memory. The second shadow page table 318 may comprise a shadow page table entry 348 that may point to a base of a page in the mirroring pages 308. Information from the shadow page table entry 348 may comprise a base address of the mirroring pages 308. In one embodiment, the hypervisor 312 may use the base address of a page in the minoring pages 308 and appropriate bits in the guest virtual address X1 of the page in the mirroring pages 308 to obtain a host physical address of the page in the mirroring page 308 being accessed actually by the host machine or a corresponding host processor.

The page table mechanism 350 and shadow page table mechanism 360 shown in FIG. 3 is only one representation of one embodiment. While FIG. 3 shows two separate shadow page tables 316 and 318 for mapped host physical pages and mirroring pages, respectively, in some embodiments, the shadow page tables 316 and 318 may be integrated in the same shadow page table. In another embodiment, the guest page table and shadow page table may be 2, 3 or 4 level page table or with more levels. In some embodiments, the page table mechanism and shadow page table mechanism may have a different hierarchy or structure as mentioned above. For example, the guest page table may be 2 level page tables, while the shadow page tables 316 and 318 may be configured as 3 level or 4 level page tables.

While FIG. 3 illustrates an embodiment of a shadow page table; in some embodiments, a direct page table may be utilized, wherein, e.g., the guest may not have an instance of guest page table. In the embodiment of direct page table, the guest may still have a "view" of its page table (e.g., operated through read/write API to the page table contents) which may be emulated by VMM 312 based on the direct page table. For example, the "view" of guest page table may be referred with regard to the guest page table 350 in FIG. 3.

Figure 4:
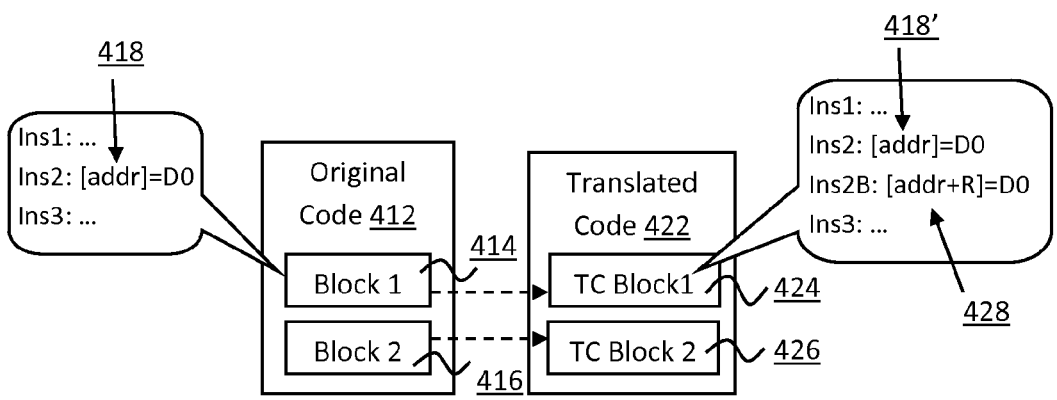
FIG. 4 is a schematic diagram of a change in the codes to provide a mirroring page.

FIG. 4 is a schematic diagram of a change in the codes or instructions to provide a minoring page. The embodiment of FIG. 4 illustrates original codes 412 of guest software on a guest machine. The original codes 412 may be stored in a guest memory. A binary translation (BT) layer or any other translation logic (e.g., BT layer 512 of FIG. 5) in a hypervisor may perform a translation on the original codes 412. In some embodiments, the BT translation layer 512 may perform various translations such as binary translation and optimization on the original codes 412; in some embodiments, the translation made by the BT translation layer 512 may not change some original codes. In the example of FIG. 4, the original codes 412 may be combined into one or more code blocks such as code block 414 and 416; however, in some embodiments, the original codes 412 may not be combined. In one embodiment, code block 414 may comprise one or more instructions.

Numerical reference 418 may refer to a guest memory write instruction 418. In one embodiment, the write instruction 418 may refer to a memory store instruction, e.g., "mov" instruction in Intel® 64 and IA-32 architectures. In another embodiment, examples of the write instruction 418 may comprise any instructions for memory store and/or processor internal state change, e.g., "push", "call", "ret", "iret", "stosb", "smovsb" instructions such as in Intel® 64 and IA-32 architectures, or similar instruction in any other architectures that may modify contents of memory. In yet another embodiment, examples of the write instruction 418 may comprise instructions that may use, e.g., floating point registers to modify memory state and/or processor internal state. The instruction 418' and/or 428 may use any write instruction support by the architecture of the. In another embodiment, the instruction 428, 418' and 418 may use same write instruction or different write instructions.

The BT layer 512 may translate the guest memory write instruction 418 into two translated write instructions 418' and 428 in the embodiment of 1 to 1 mirroring, and may translate the guest memory write instruction 418 into a plurality of (e.g., n) translated write instructions in the embodiment of n to 1 mirroring. The translated write instruction 418' may access the same guest memory location or address as the original guest memory write instruction 418. For example, as shown in FIG. 4, the translated code 418' may write "D0" in the address "[addr]", e.g., X0 in the embodiment of FIG. 3. In the embodiment of FIG. 2, the content "D0" may be written to the address 232 in the mapped host physical memory space 218.

Referring to FIG. 4, the translated code for the guest memory write instruction 418 may further comprise an additional write instruction 428 to write the content "D0" in an address "[addr+R]", e.g., X1 in the embodiment of FIG. 3, wherein "R" represents an offset to the original address "[addr]". In response to the translated code 428, the content "D0" written or to be written in the address "[addr]" may be mirrored to the address "[addr+R]". In another embodiment, the content "D0" may be mirrored to one or more mirroring addresses, e.g., by using a plurality of mirroring data write instructions 428. In one embodiment, the offset "R" may have a fixed value; however, in some embodiments, the offset may not be fixed and/or other policy may be used to form a mirroring memory. In the embodiment of FIG. 2, the content "D0" is shown as written in the address 234 of the mirroring memory space 220. In some embodiments, the content "D0" may be written in a plurality of address of the mirroring memory space 220 in the host physical memory 214.

The BT layer may combine translated codes for one or more guest memory write instructions together to form a translated code (TC) block such as TC blocks 424 and 426. In one embodiment, the BT layer may mirror memory in response to each guest memory write in a TC block. In another embodiment, the BT layer may update the mirroring memory in response to each TC block. In either embodiment, the BT layer 512 may keep each TC block atomic and may undo the one or more write operations in the whole TC block. When a memory failure happens within the TC block before the mirroring memory and the guest memory are both updated in response to executing the TC block, the hypervisor 510 may inform BT layer 512 to re-execute the whole operation of the TC block from the beginning of the TC block. The translated codes may be stored in a translation cache such as translation cache 516 of FIG. 5; in some embodiments, the translated codes may be stored in processor 126, memory 120, any other memory devices or any other storage locations in the platform hardware 116 and/or any combination of these components and locations. In some embodiments, the translated codes may include codes that may be changed based on the translation made by the BT layer 512 and/or codes that may not be changed after the translation made by the BT layer 512. In some embodiments, the BT layer may only combine translated instructions corresponding to write instructions into one or more TC blocks; in some embodiments, the instructions combined into the TC blocks may not be write instructions.

In another embodiment, the BT layer may modify translated codes to perform a comparison of the contents in memory addresses for the original guest memory and the mirroring memory after executing the memory write instruction and mirroring memory write instruction(s) to verify the writes have been executed correctly; however, in some embodiments, the comparison may not be necessary.

In the example as shown in FIG. 4, translated codes for an original guest memory write instruction may be executed earlier than executing translated codes for writing a mirroring memory for simplicity in description; however, in some embodiments, a different order may be implemented, e.g., the translated codes may not write the guest memory earlier than the mirroring memory.

Figure 5:
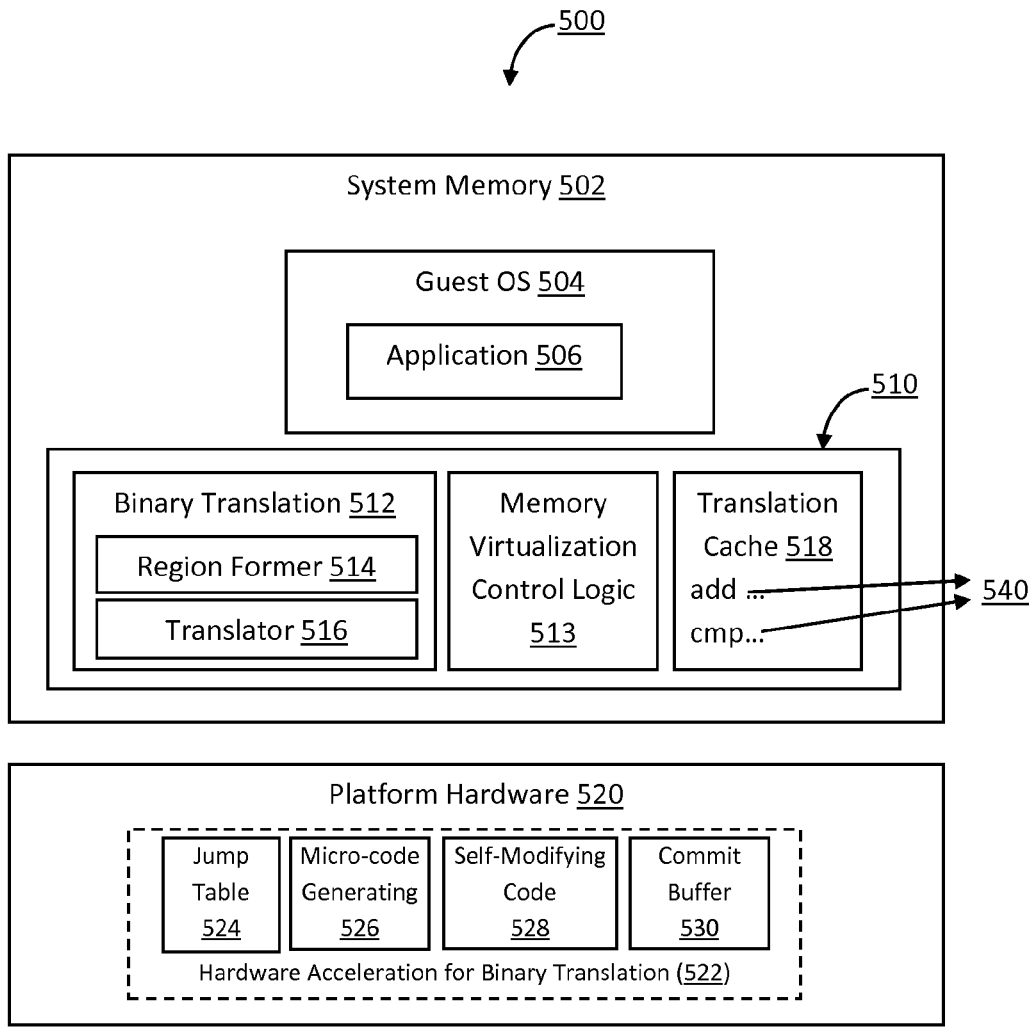
FIG. 5 illustrates a schematic block diagram of a processor based system.

FIG. 5 illustrates a block diagram of an embodiment of a processor based system. The system 500 comprises a system memory 502, in which guest OS 504 and application 506 or other guest software and applications running on a virtual machine may be stored. The system 500 may further comprise a VMM such as a hypervisor 510 or any other virtual machine control logic that may be resident in the system memory 502 or any other location. The hypervisor 510 may comprise a binary translation (BT) layer or logic 512. While FIG. 5 illustrate an embodiment of using BT layer 512 in the hypervisor 510, in some embodiments, any other translation layer or logic may be utilized by the hypervisor 510. The hypervisor 510 may comprise a memory virtualization control logic 513. For example, the description on the memory virtualization control logic 513 may refer to the embodiments as mentioned above with regard to the memory virtualization management logic 130.

The BT layer 512 may comprise a region former 514 and a translator 516. The translator 516 may perform a binary translation or any other translation and/or optimization on original codes to generate translated codes 540. In one embodiment, the translator 516 may further generate translated codes or one or more memory write instruction to mirror data written or to be written for each guest memory write to a mirroring memory. The translated codes may be formed one or more translated code blocks or in any other combination format by the region former 514. The translated code blocks may be stored in a translation cache. The region former 514 may keep the translated code block as an atomic region. In another embodiment, the translated codes for the mirroring memory writes may further be stored in one or more internal buffers (not shown) in the processor of the platform hardware 520 and may be invisible to the system memory 502 and/or hardware acceleration for binary translation 522. In some embodiments, hardware acceleration may not be necessary or in any other format, the binary translation or other translation supports may be implemented in hypervisor.

The translated codes such as one or more translated code blocks may be stored (e.g., by the hypervisor) in a translation cache 516 in the hypervisor 510 or any other location in the system. The platform hardware 520 may comprise a jump table 524. In response to the translated codes being stored in, e.g., translation cache 516, the jump table 524 may comprise a mapping between original memory addresses corresponding to the original codes and translation cache addresses for the translated codes. In response to the platform hardware 520 such as a processor or any other execution logic executing original codes pointed to by an original memory address in the jump table, the processor or any other execution logic may jump to a corresponding translation cache address based on the jump table and execute the translated codes in the translation cache address. In one embodiment, the platform hardware 520 may comprise a micro code generating logic 526 that may further translate translated codes 540 into any other formats of micro codes to support various instructions microcode backend; however, in some embodiments, the translation from the translated codes 540 to other micro codes may not be necessary. In one embodiment, micro codes from the micro code generating logic 526 may be executed by the processor or any other execution logic in the platform hardware 520.

Referring to FIG. 5, the platform hardware 520 may comprise a self-modifying code (SMC) logic 528 to provide a self-code modifying function in the platform hardware; however, in some embodiment, the SMC logic 530 may not be necessary. The platform hardware 520 may further comprise a commit buffer 530. The commits of all memory writes in every atomic region may happen at the end of the execution of the atomic region. For example, in response to the processor executing memory write instructions in an atomic region, all the write instructions in the atomic region may be stored in one or more internal buffers in the processor and the processor may execute the write instructions together or substantially simultaneously after all the write instructions are stored in the buffers. In response to the memory write instructions in an atomic region being executed, a corresponding execution result may be provided to one or more status registers or control registers in the processor, such as RAX, RBX, RCX, etc. In one embodiment, the BT layer 512 may, among other ways, utilize the hardware feature of restricted transactional memory in the underneath hardware 520 to ensure a translated code block as an atomic region.

In response to a memory failure, the processor may notify machine check exception (MCE) handler (not shown) in VMM (512 or 510 up to implementation). The MCE handler may take the control and identify the corrupted memory page based on the information provided by the processor such as the error physical address (e.g., EHPN1). If a corrupted page is within guest pages, hypervisor 510 may offline or disable the corrupted page and allocate a new page to backup the corrupted memory page. Hypervisor 510 may modify the mappings used for the guest such as the shadow page table or direct page table pointing to the new page, and/or any other machine-to-guest-physical page mapping data structure, guest-physical-to-machine page mapping data structure and/or machine-to-mirroring page mapping data structure. The hypervisor 510 may look up the machine-to-guest-physical page mapping data structure to determine the error guest physical page (e.g., EGPN1), or it may search in the guest-physical-to-machine page mapping data structure to determine the EGPN1. The hypervisor 510 may use the guest-physical-to-minoring page mapping data structure to determine the minoring host page number (MHPN1) for the EGPN1. In another embodiment, the hypervisor may directly use the machine-to-mirroring page mapping data structure to determine the minoring host page number (MHPN1). In response to determining the MHPN1, the hypervisor 510 may restore the contents of the guest memory from the mirroring page (MHPN1), and inform the BT layer 512 to continue execution if the mirroring memory is updated with latest data. In another embodiment, the hypervisor 510 may discard the current TC block operation to re-execute the TC block if mirroring memory is not updated or BT layer 512 may undo the previous one or more write operations. If the corrupted page is within a minoring page, the hypervisor 510 may use a new page to replace the corrupted minoring page and restore the content of the minoring page from the original mapped physical page, e.g., 218. While the hypervisor of FIG. 5 is implemented by a plurality of separate logic, in some embodiments, the plurality of logic may not be integrated in one or more logic or modules. In some embodiments, the logic in the hypervisor of FIG. 5 may be realized by software, hardware, firmware and/or any combination of them or may be implemented the hardware platform.

Figure 6:
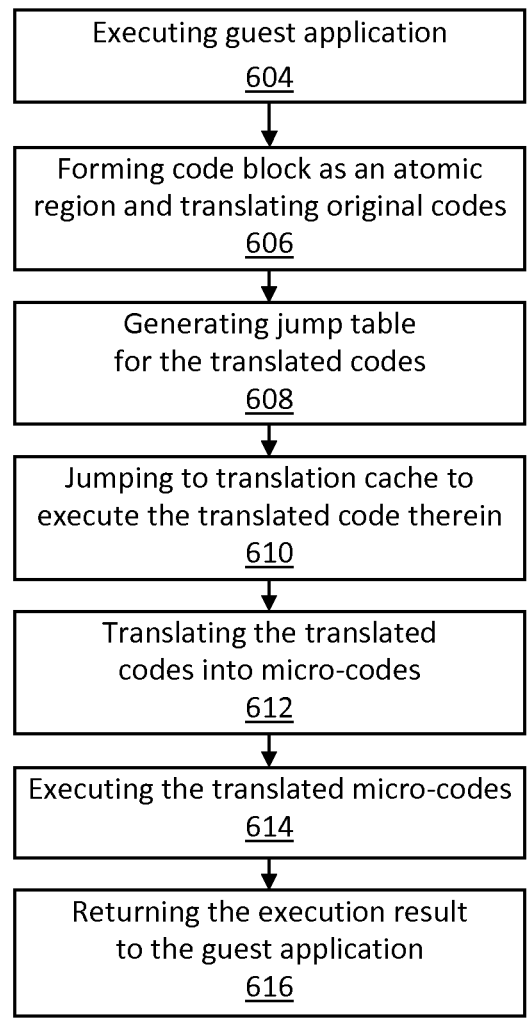
FIG. 6 illustrates a schematic diagram of a method according to an embodiment of the invention.

The flowchart of FIG. 6 depicts execution of guest application in one embodiment. The execution begins at 604. The processor may combine one or more writes in original codes in the guest application into a code block, e.g., via a region former in the binary translation layer. The processor may utilize hardware feature of restricted transaction memory underneath the binary translation layer to form the code block as an atomic region. In block 606, the processor may translate, e.g., via the translator 516, the original codes into binary translated codes that may be stored in a translation cache. In another embodiment, the processor may perform any other translation or optimization on the original codes.

Referring to FIG. 6, in block 606, the processor, e.g., via a translator 516, may further translate each write instruction in the atomic region to generate a first translated write instruction that is binary translated and a second translated write instruction that writes the mirroring memory. The first translated write instruction and the second mirroring memory write instruction may write the same content in the guest memory (e.g., a guest memory page) and the mirroring memory (e.g., a mirroring memory page), respectively, or copy the content written or to be written to the guest memory in the mirroring memory. The second translated write instruction itself may be binary translated by the processor. In some embodiments, the atomic region may be formed in response to the original codes being translated in block 606.

In block 608, the processor may generate a jump table that comprises a mapping between original guest memory addresses corresponding to the original codes and translation cache addresses for the translated codes. The jump table may comprise one or more records or entries that may each map an original guest memory address to a translation cache address. In one embodiment, the jump table may provide an index for each record in the jump table. In response to the execution of the guest application reaching a guest memory address in the jump table, the processor may jump to the translation cache and access a corresponding translation cache address to obtain the translated codes relating to the translation cache address (block 610). In block 612, the processor via such as a micro-code generating logic may further translate the obtained translated codes into micro-codes with the format that is supported by the processor. In block 614, the processor or any other execution logic may execute the micro-codes. In block 616, the processor may return the execution result to the guest application. The result may comprise status information and/or control information relating to the execution of the translated codes. For example, the status information and the control information may be stored in one or more control/status registers. In one embodiment, the flow may continue to execute the guest application based on the status information and the control information.

Figure 7:
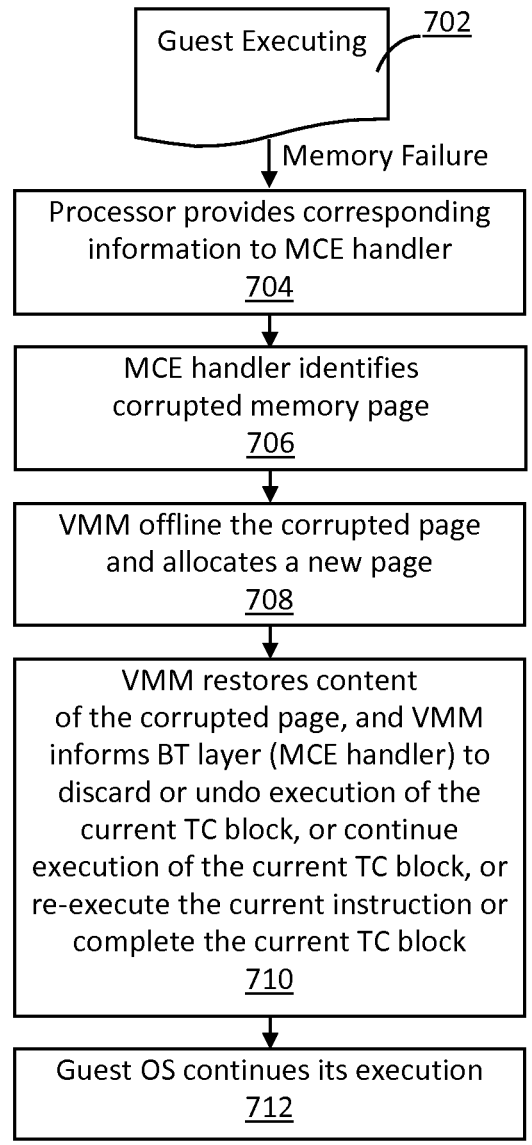
FIG. 7 illustrates a schematic diagram of a method according to another embodiment of the invention.

The flowchart of FIG. 7 depicts execution of restore a corrupted memory page in one embodiment. In block 702, the processor may execute guest codes based on one or more guest applications in a guest OS. In one embodiment, the processor may jump to execute translated guest codes based on a translation code address in a jump table. In response to a memory failure during the execution of the translated codes, the processor may detect the memory failure (block 704). The processor may send information relating to the memory failure to MCE handler or any other control logic that may be provided in VMM or hypervisor. In one embodiment, the MCE handler may be implemented by software, hardware, firmware or any combination thereof. The MCE handler may take control in response to receiving the memory failure related information from the processor (block 706). The information may indicate that the memory failure happens in the guest code. The information may indicate a corrupted memory page, e.g., a memory location of the corrupted page. In one embodiment, the MCE handler may identify the corrupted memory page from the information. In block 708, VMM may offline or disable the corrupted memory page and allocate a new memory page to replace the corrupted memory page, e.g., via memory virtualization management logic in VMM.

In block 710, if the failure happens in the guest memory, VMM may restore content of the corrupted page from the mirroring memory. In one embodiment, VMM may inform the BT layer to undo the execution of a current TC block, copy the contents from mirroring page to the new memory page to restore the content of the corrupted guest memory page, and re-execute the current TC block. Referring again to FIG. 4, in another embodiment, if the execution of a TC block has updated both the guest memory page and the mirroring page, e.g., both instructions 418' and 428 have been executed, or if the execution of a TC block has not updated either the guest memory or the mirroring memory, e.g., before the execution of instruction 418' or 428, the VMM may copy the contents from the mirroring page to the new memory page, and continue the execution of the TC block. In yet another embodiment, if the execution of a TC block has updated a guest memory address, but has not updated the mirroring address, e.g., instruction 418' has been executed, but instruction 428 has not been executed, VMM may copy the contents from the mirroring page to the new memory page, re-execute instruction 418' and execute 428. In still another embodiment, if the execution of a TC block has updated the guest memory address, but has not updated the mirroring memory address, e.g., instruction 418' has been executed, but instruction 428 has not been executed, VMM may complete execution of the current TC block, e.g., the instruction 428 and copy the contents from the updated minoring page to the new memory page in response to the completion of the current TC block. In another embodiment, if the execution of a TC block has updated one memory address, but has not updated the second memory address, e.g., one of instructions 418' and 428 has been executed, VMM and/or BT layer may determine which address has been updated, and which address has not been updated. If the mirroring address has been updated, VMM may copy the contents from mirroring page to the new memory page and continue execution.

In block 712, the processor may continue to execute a next translation code block or subsequent translated codes (block 712). Then, the processor may continue the execution of the guest OS. Similarly, in response to determining that the mirroring memory has a corrupted page, the VMM may allocate a new page for the corrupted minoring page and restore the content of the corrupted minoring page from the corresponding guest page. The flow to recover guest memory failure and the flow to recover minoring memory failure may refer to the embodiments as mentioned above with regard to block 710. For example, if the execution of a TC block has updated one memory address, but has not updated the second memory address, e.g., instruction 418' has been executed, but instruction 428 has not been executed, VMM and BT layer may determine which address has been updated, and which has not. If the guest memory address has been updated, VMM may copy the contents from guest page to the new memory page to recover the failure in the mirroring memory and continue execution.

While the methods of FIGS. 6 and 7 are illustrated to comprise a sequence of processes, the methods in some embodiments may perform illustrated processes in a different order. While the methods of FIGS. 6 and 7 are described based on a configuration of one minoring page mapping to one guest page, the spirits of FIGS. 6 and 7 may be utilized for a configuration of n mirroring page mapping to one guest page. For example, the VMM may use content from one of mapped mirroring pages to recover the memory failure in the guest page. In another embodiment, the VMM may utilize the content of a guest page to recover the memory failure in one or more mirroring pages in the n to 1 configuration.

While the embodiment of FIG. 7 illustrates an example of a TC block wherein e.g., instruction 418' is executed before instruction 428, in some embodiments, the flow of FIG. 7 may be applied similarly a TC block wherein, e.g., instruction 418' is executed after instruction 428. If the memory failure happens in the guest memory, VMM may similarly allocate a new guest memory page for the corrupted guest memory page. In one embodiment, VMM may inform the BT layer to undo the execution of current TC block, copy the contents from minoring page to the new memory page to restore the content of the corrupted guest memory page, and re-execute the current TC block. In another embodiment, if both instructions 418' and 428 have been executed, or if none of instruction 418' and 428 has been executed, the VMM may copy the contents from the mirroring page to the new memory page, and continue the execution of the TC block. In yet another embodiment, if instruction 428 has been executed but 418' has not been executed, VMM may copy the contents from the minoring page to the new memory page and continue the execution of the TC block from 418'. In still another embodiment, if instruction 428 has been executed but instruction 418' has not been executed, VMM may complete execution of the current TC block, e.g., from 418' and copy the contents from the updated mirroring page to the new memory page in response to the completion of the current TC block. In another embodiment, if the execution of a TC block has updated one of the guest and minoring memory address, e.g., one of instructions 418' and 428 has been executed, VMM and/or BT layer may determine which address has been updated and which has not. If the minoring address has been updated, VMM may copy the contents from minoring page to the new memory page and continue execution.

While certain features of the invention have been described with reference to embodiments, the description is not intended to be construed in a limiting sense. Various modifications of the embodiments, as well as other embodiments of the invention, which are apparent to persons skilled in the art to which the invention pertains are deemed to lie within the spirit and scope of the invention.

What is claimed is:

1. An apparatus, comprising:
 a memory virtualization control logic to translate from a first virtual memory address in the virtual address space of a guest indicated in a first guest memory writing instruction to a first physical memory address in a host address space of a host; and
 a translation logic to translate the first guest memory writing instruction into a first set of translated codes that are to store a first content in the first physical memory address and to store the first content in a second physical memory address in the host that is a mirroring address for the first physical memory address, complete the execution of the first set of translation codes in response to a memory failure in the first physical memory address during the execution of the first set of translated codes, and copy the content of the second physical memory address to the first physical memory address.

2. The apparatus of claim 1, wherein the memory virtualization control logic is further to translate the first virtual memory address to a guest physical address based on a guest page table.

3. The apparatus of claim 2, wherein the memory virtualization control logic is further to:
translate the first virtual memory address to the first host physical memory address based on a physical page table that is synchronized with the guest page table;
add an offset on the first virtual memory address to generate a second virtual memory address; and
translate the second virtual memory address to the second host physical memory address based on the physical page table.

4. The apparatus of claim 3, wherein the memory virtualization control logic is further to:
emulate the guest page table to the guest base on the physical page table.

5. The apparatus of claim 1, wherein the translation logic is further to:
translate the second guest memory writing instruction relating to a second virtual memory address of the guest into a second set of translated codes that are to store the second content in a third physical memory address corresponding to the second virtual memory address and to store the second content in a fourth physical memory address of the host that is a mirroring address for the third physical memory address; and
form an atomic region that comprises the first set of translation codes and the second set of translation codes.

6. The apparatus of claim 1, wherein the translated codes are further to copy the content into a plurality of mirroring memory address in the host.

7. The apparatus of claim 5, wherein in response to a memory failure in the first physical memory address during the execution of the translated codes in the atomic region, the translation logic is further to undo the execution of the translated codes.

8. The apparatus of claim 5, wherein in response to a memory failure in the first physical memory address during the execution of the translated codes in the atomic region, the VMM is further to allocate a new physical memory page for the corrupted first physical memory page to restore the content of the corrupted first physical memory page from the second physical memory page, and further continue the execution of the translation codes in the atomic region.

9. The apparatus of claim 1, wherein the VMM is further to offline the corrupted memory page corresponding to the first physical memory address and allocate a new page to replace the corrupted memory page.

10. A method, comprising:
forming original codes for writing guest memory into an atomic region;
translating the original codes into translated codes that are to write the guest memory and a host mirroring memory for the guest memory;
executing the translated codes in the atomic region to write the same content into the guest memory and the host mirroring memory;
continuing the execution of the translated codes to update the guest memory and the host mirroring memory, in response to a memory failure in the guest memory during the execution of the translated codes; and copying a content of the updated host mirroring memory to the guest memory with the memory failure to recover the content of the guest memory.

11. The method of claim 10, further comprising:
generating a mapping comprising a translation from a virtual memory address of the guest memory to a host physical memory address; and
adding an offset to the virtual memory address to generate an offset virtual address for the host mirroring memory; and
updating the mapping to generate a translation from the offset virtual address to a physical memory address of the host mirroring memory.

12. The method of claim 10, further comprising:
completing the execution of the translated codes in the atomic region, in response to a memory failure in the guest memory during the execution of the translated codes;
copying a content of the host mirroring memory that is updated based on the translation codes to the corrupted guest memory to recover the content of the corrupted guest memory.

13. A system, comprising:
a memory;
a virtual machine control logic to translate a guest memory updating instruction into a first instruction to update a guest memory page of a guest and a second updating instruction to update a mirroring memory page in a host that is corresponding to the guest memory page, allocate a new memory page for the guest memory page in response to a memory failure in the guest memory page during the execution of the first updating instruction and the second updating instruction, copy a content of the host mirroring page to the new guest memory page; and
a processor to execute the first instruction and the second instruction to store the same content to the guest memory page and the mirroring memory page.

14. The system of claim 13, wherein the virtual machine control logic comprises a region forming logic to combine the guest memory updating instruction and another guest memory updating instruction to form an atomic region that is to be executed by the processor together.

15. The system of claim 14, wherein the virtual machine control logic is further to undo the operations in the atomic region in response to a memory failure in the guest memory page and in response to the mirroring memory page not having been updated, and allocate a new guest memory page to replace the corrupted guest memory page and restore the content of the new guest memory page from the mirroring memory page.

16. The system of claim 15, wherein the virtual machine control logic is further to update a guest-physical-to-machine page mapping data structure and a machine-to-guest-physical page mapping data structure in response to the corrupted guest memory page being replaced by the new guest memory page.

17. The system of claim 13, wherein the virtual machine control logic is further to completion the execution of the first updating instruction and the second updating instruction in response to a memory failure in the guest memory page; and copy a content of the host mirroring page to the new guest memory page allocated for the corrupted guest memory page to recover the content of the corrupted guest memory page in response to the completion of the first updating instruction and the second updating instruction.

* * * * *